United States Patent [19]

Homer

[11] 4,347,067

[45] Aug. 31, 1982

[54] GAS SCRUBBER WITH PLURAL VERTICAL LIQUID INLETS

[75] Inventor: Arthur J. Homer, Selcourt, South Africa

[73] Assignee: Marrett Manufacturing (Proprietary) Limited, Boksburg, South Africa

[21] Appl. No.: 263,538

[22] Filed: May 14, 1981

[51] Int. Cl.³ .................... B01D 47/02; B01D 47/10
[52] U.S. Cl. ........................... 55/227; 55/249; 55/255; 55/256; 55/DIG. 30; 261/77; 261/123; 261/DIG. 54
[58] Field of Search ......... 55/249, 255, 256, DIG. 30, 55/227; 261/70, 77, 123, DIG. 54; 60/310

[56] References Cited

U.S. PATENT DOCUMENTS

| | | | |
|---|---|---|---|
| 2,150,614 | 3/1939 | Sotkowski | 261/123 |
| 2,673,619 | 3/1954 | Martin | 55/255 |
| 3,642,452 | 2/1972 | Roget et al. | 261/123 |
| 4,190,629 | 2/1980 | Strachan | 55/256 |
| 4,197,265 | 4/1980 | Burke | 261/70 |
| 4,255,361 | 3/1981 | Goettl | 261/70 |

FOREIGN PATENT DOCUMENTS

| | | | |
|---|---|---|---|
| 61878 | 11/1941 | Denmark | 55/255 |
| 771706 | 3/1977 | South Africa . | |
| 574591 | 1/1946 | United Kingdom | 55/249 |

*Primary Examiner*—David L. Lacey
*Attorney, Agent, or Firm*—Sughrue, Mion, Zinn, Macpeak & Seas

[57] ABSTRACT

A flame-proof gas-scrubber having a housing adapted to be filled to a predetermined level with a scrubbing liquid, a downwardly extending gas inlet conduit 6, and a series of liquid inlets 16, 24 in a fluid flow path around the outside of the inlet conduit. The liquid inlets communicate with the body of scrubbing liquid well below the level thereof, and a deflector 29 and venturi throat 26 are included concentrically in the fluid flow path for aiding the mixing of the gas and liquid. A skirt 33 surrounds the upper end of the inlet conduit 6 to direct the mixture downwardly above the liquid level to provide for liquid/gas separation.

10 Claims, 3 Drawing Figures

GAS SCRUBBER WITH PLURAL VERTICAL LIQUID INLETS

BACKGROUND OF THE INVENTION

This invention relates to gas-scrubbers, particularly scrubbers suitable for use in cleansing exhaust gases from internal combustion engines.

South African Pat. No. 77/1706, commonly assigned, describes a gas-scrubber for use in an internal combustion engine wherein a gas inlet conduit opens upwardly into an upwardly extending receiving conduit, with the space between these two conduits adapted to be maintained below a predetermined liquid level in the scrubber. A cap is located over the open upper end of the receiving conduit to form a passage opening downwardly on the outside of the receiving conduit in a region above the liquid level so that the gas and liquid can separate and the scrubbed gas can leave the scrubber.

In order to achieve satisfactory scrubbing of the gas it was, in many cases, necessary to have two stages which were substantially independent of each other. In one case the upwardly opening gas inlet conduit supplied the gas from a primary scrubbing stage laterally offset therefrom. In another case two substantially identical stages were provided in adjacent housings which could either be of a unitary construction or separate.

SUMMARY OF THE INVENTION

It has now been found that improved gas-scrubbing can be achieved by the use of a compact arrangement of flow passages all located substantially symetrically about a main axis for the scrubbing mechanism.

In accordance with this invention there is provided a gas-scrubber comprising a scrubbing mechanism located within a container shaped housing adapted to contain a scrubbing liquid to a predetermined level therein and wherein the scrubbing mechanism is arranged concentrically with a downwardly extending gas inlet conduit, means for distributing gas emanating from the lower end of the inlet conduit around the circumference thereof and such that the path of the gas is upwardly on the outside of the conduit, a first scrubbing liquid inlet located adjacent the passage for upwardly moving gas emanating from the conduit end and communicating with the body of liquid contained in the container shaped housing, a plurality of angularly spaced upwardly directed transfer conduits co-operating with larger diameter co-axial tubular passages which define therewith both a second scrubbing liquid inlet and venturi means for drawing further quantities of scrubbing liquid into admixture with the initial gas-liquid mixture and wherein the tubular members are located directly above the transfer conduits, and a cowling enclosing the above mentioned gas inlet conduit and associated parts and defining a mixing chamber above the tubular members for promoting adequate mixing of the gas and scrubbing liquid and an outlet at the upper end of the cowling which is co-axial with the inlet conduit for directing a gas liquid mixture outwardly above the level of liquid in the scrubber housing.

Further features of the invention provide for a third scrubbing liquid inlet to be defined on the outlet side of the tubular members and between the tubular members and a venturi shaped throat which is also concentric with the inlet conduit and cowling and for a deflector arrangement to be provided within the mixing chamber for promoting turbulence of gas-scrubbing liquid mixtures above the liquid inlet; for the outlet at the top of the cowling to be directed laterally by means of a plate located over the top of the cowling and for a skirt to extend downwardly from the top of the scrubber housing concentrically with the cowling but spaced radially therefrom to provide a downward flow path for gas-scrubbing liquid mixtures emanating from the cowling.

Clearly the cowling must have suitable liquid inlets to provide access for liquid to the various inlet arrangements and there are preferably two such inlets. The first inlet is in the form of a circumferentially extending slot in the side wall of the cowling and which communicates by way of passages with a centrally located inlet for scrubbing liquid located concentrically beneath the outlet end of the inlet conduit. The second inlet is similarly a circumferentially extending slot located above the first inlet and which provides access for liquid to both the transfer conduit and tubular member assemblies and the venturi throat at the outlet end of the tubular members.

The inlet to the gas-scrubber can either be by way of a right angled bend communicating with a transverse connection conduit so that connection is effected at right angles to the gas inlet conduit or, alternatively, the gas inlet conduit could extend up the entire height of the scrubber housing to provide a connection at the top thereof for an inlet pipe conveying exhaust gases to the scrubber.

Clearly the scrubber will have a scrubbing liquid supply which is maintained at a predetermined level by any suitable means and, conveniently, by a float controlled valve. In the latter instance the float controlled valve is preferably shielded from the gas-scrubbing liquid mixture emanating from the outlet end of the scrubbing mechanism and this can be achieved by means of a suitable baffle which defines, in effect, a float valve chamber.

DETAILED DESCRIPTION OF THE PREFERRED EMBODIMENTS

Figure 1:
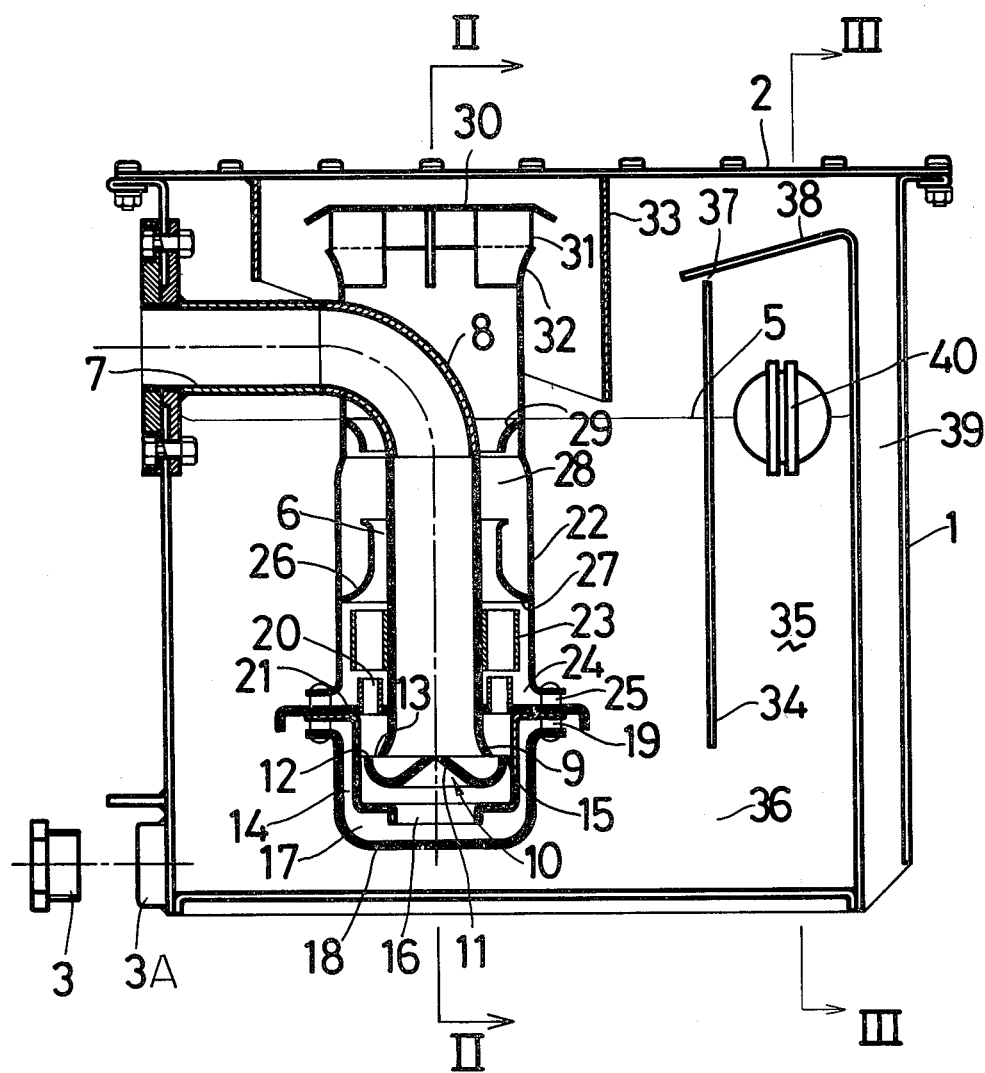
FIG. 1 is a sectional elevation of a preferred form of a gas-scrubber according to this invention.
Figure 2:
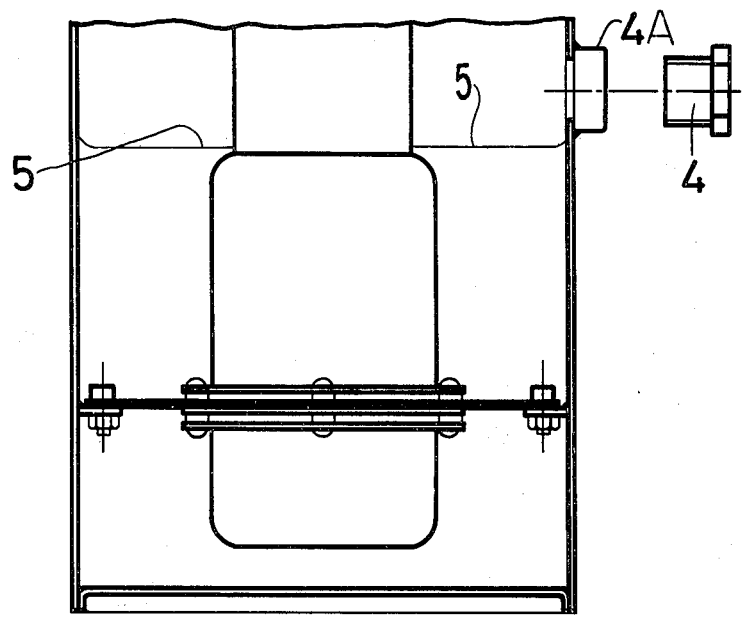
FIG. 2 is a section taken along line II—II in FIG. 1.

In the disclosed embodiment of the invention the gas-scrubber comprises a housing or chamber 1 having a removable lid 2 secured thereto, a drain conduit 3A having a plug 3 is positioned at the bottom end thereof and a filler conduit 4A having a plug 4 at a chosen position up the height of the chamber and which corresponds with the liquid level to be maintained in the housing in use. Such liquid level is indicated by reference numeral 5 in FIGS. 1 and 2.

A downwardly directed exhaust inlet conduit 6 communicates with a transverse inlet connection 7 by way of a pipe bend 8. The open lower end 9 of the inlet conduit is flared outwardly and cooperates with a distribution member 10 having a concentric conical portion 11 of large cone angle for distributing gases equally angularly about the inlet conduit. The distribution member also has a basically cupped configuration so that the free periphery 12 thereof is roughly co-planar with the end of the inlet conduit and defines together therewith an annular outlet 13.

A first liquid inlet defining member 14 is of basically cup shape and defines with the outer periphery of the distribution member an annular inlet 15 for liquid immediately adjacent that for the gases. The inlet defining member has an inlet 16 co-axial with the inlet conduit but below the distributor member 10. An inlet passage 17 is defined between the member 14 and a lower cowling member 18 which defines a circumferentially extending slot 19 communicating with the interior of the housing and well below the liquid level 5.

Located a short distance above the annular inlets 13 and 15 for the gas and liquid, respectively, are a plurality of equally angularly spaced transfer conduits 20 supported by and forming passages through a dividing plate 21 secured to the upper and lower cowling members 22 and 18, respectively.

The upper ends of the transfer conduits open a short distance below larger diameter tubular members 23 so that a venturi effect is created whereby further liquid may be drawn in through the space between the upper ends of the transfer conduits and the lower ends of the tubular members. An inlet passage 24 is defined between these members and the upper cowling member 22, and a slot shaped inlet 25 communicates between the inlet passage 24 and the interior of the housing well below the liquid level 5 and at the lower end of the upper cowling member 22.

The inlet passage 24 also feeds the upper ends of the tubular members 23 where they are directed to feed into a venturi shaped throat 26. The passage 24 communicates with the throat by way of a space 27 between the lower end of the throat and the upper ends of the tubular members.

The throat itself opens into a chamber 28 where mixing is to continue between the gases and the scrubbing liquid. Preferably a deflector plate 29 in the shape of substantially a reverse throat is included at a position spaced upwardly from the throat 26. The chamber is defined by the cowling 22 in its upper region, and the top of the cowling has a transverse plate 30 secured thereover and comprises a substantially circumferentially extending outlet 31 directed outwardly at the top of the cowling. The cowling can, for convenience, be flared outwardly at its upper end 32.

A downwardly extending skirt 33 is provided to encircle the outlet 31 at a position spaced radially outwardly to an extent adequate to ensure that gas and liquid flow is not impeded to any great extent but simply directed downwardly. The skirt terminates short of the liquid level and, in fact, the skirt may have different lengths at different angular positions so that at a position remote from the inlet connection 7 it has its maximum height.

Laterally offset from the cowling which, as will be clear from the drawings, is concentric with the inlet conduit 6, is a baffle defining wall 34 forming a float chamber 35 which communicates with the interior of the housing by way of a large space 36 at the lower end of the wall. A small slot 37 is provided between the upper end of the wall and a plate 38 defining the outlet for gases, which communicates with a downwardly extending passage 39 from where gases ultimately leave the scrubber.

The float chamber has a float controlled valve 40 installed therein for maintaining the scrubbing liquid level at that indicated by reference numeral 5.

Figure 3:
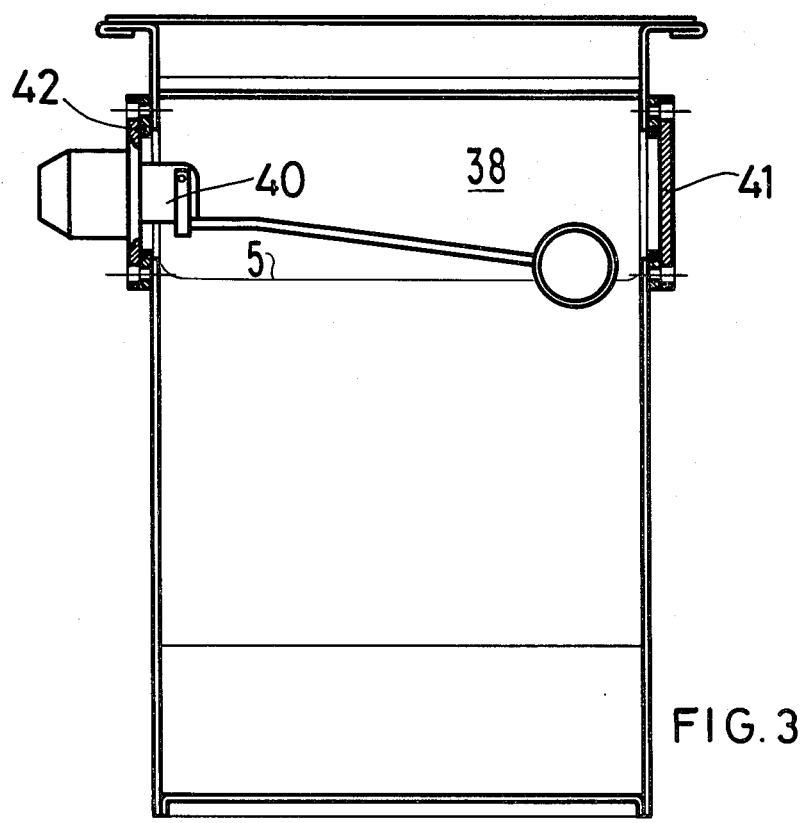
FIG. 3 is a sectional side view taken along line III—III in FIG. 1 illustrating the float chamber.

For convenience sake access apertures (shown clearly in FIG. 3) 41 and 42 are provided to enable the float controlled valve to be removed and serviced easily without necessitating removal of the lid or dismantling of the apparatus. This arrangement also enables the outlet defining plate 38 and baffle wall 34 to be permanently welded in position in the housing, and provides for simple maintenance of the float controlled valve by the simple removal of the valve through a side aperture.

In use, exhaust gases from an internal combustion engine are introduced through the connection 7 and thence into the inlet conduit 6 which feeds the gases downwardly onto the distribution member 10. The distribution member, by virtue of its shape, distributes the exhaust gases substantially equally around the inlet conduit, and the annular passage 13 ensures that the exhaust gases are then directed upwardly. At the same time as they proceed upwardly they draw with them scrubbing liquid through the adjacent annular inlet 15, and mixing of the exhaust gases and scrubbing liquid immediately commences. This mixture proceeds through the transfer conduits 20 and into the lower ends of the tubular members 23. This process draws further scrubbing liquid in through the space between the adjacent ends of the tubular members and transfer conduits and further mixing takes place in the tubular members. At the upper ends of the tubular members still further scrubbing liquid is drawn in through the spaces 27 defined by the throat 26.

Still further mixing takes place during passage through the throat and into the mixing chamber 28 above. The deflector plate 29 causes additional turbulence to take place thereby again enhancing the mixing. Ultimately the gas and liquid mixture emanates from the outlet 31 at the top of the cowling and separation proceeds to take place within the skirt as the mixture proceeds downwardly. The separated gas then proceeds through the outlet 39 to atmosphere or any other destination which has been determined therefor.

It has been noted that the scrubber of the present invention tends to provide for increased liquid circulation within the scrubber with increased gas flow therethrough which was not the case with the scrubber defined in the earlier patent mentioned above. Also, the gas-scrubber according to this invention is entirely flame-proof in operation and can therefore be employed in flammable atmospheres such as are present in many underground mines and, in particular, coal mines or the like. Also, in many factories inflammable or explosive atmospheres exist and such flame-proof gas-scrubbers are most useful in such instances.

It will be appreciated that the entire gas-scrubber described above can be manufactured from pressed or otherwise fabricated parts, and costly castings or similar parts are not required. This also has the advantage that the gas scrubbers can easily be made from stainless steel parts welded together in known manner.

It will be understood that many variations may be made to the above described embodiment of the invention without departing from the scope hereof. In particular the number of liquid scrubbing inlets could be limited to two and a throat could be positioned on the inlet side of the transfer conduits. Also, the transfer conduits and tubular member arrangements could be replaced by venturi systems. Also the throat and deflector plate could be omitted, or replaced by comparable equivalent structural elements.

What is claimed:

1. A gas-scrubber, comprising: a scrubbing mechanism located within a container shaped housing (1) containing a scrubbing liquid to a predetermined level (5), gas inlet conduit (6) having a portion thereof extending downwardly within said housing and wherein the scrubbing mechanism is arranged concentrically with said downwardly extending portion of said gas inlet conduit (6), said mechanism comprising means (10) for distributing gas emanating from a lower end of the inlet conduit portion around the circumference thereof such that the path of the gas is upwardly directed around the outside of the inlet conduit portion, means (14) surrounding the distributing means for defining therewith a first scrubbing liquid inlet (15) located adjacent the path for upwardly moving gas emanating from the lower end of the inlet conduit portion and having an opening (16) communicating with the liquid contained in the housing, a plurality of angularly spaced upwardly directed transfer conduits (20) disposed around the inlet conduit portion in said path above the first scrubbing liquid inlet and constructed and arranged with respect to larger diameter co-axial tubular passage members (23) located directly above the transfer conduits so as to define therewith both a second scrubbing liquid inlet and venturi means for drawing further quantities of scrubbing liquid into admixture with the initial gas-liquid mixture, a cowling (22) enclosing the gas inlet conduit portion, transfer conduits and tubular members and defining a mixing chamber (28) above the tubular members for promoting adequate mixing of the gas and scrubbing liquid, and means defining an outlet (31) at the upper end of the cowling co-axial with the inlet conduit portion for directing a gas liquid mixture outwardly above the level of liquid in the scrubber housing and said housing having a gas outlet.

2. A gas-scrubber as claimed in claim 1, further comprising a venturi shaped throat (26) concentric with the inlet conduit portion and cowling and positioned and arranged with respect to the tubular members to define a third scrubbing liquid inlet on the outlet side of the tubular members.

3. A gas-scrubber as claimed in claim 1, further comprising a deflector (29) disposed within the mixing chamber and above the first and second liquid inlets for promoting turbulence of the gas-scrubbing liquid mixtures.

4. A gas-scrubber as claimed in claim 1, further comprising a plate (30) located over the outlet means at the top of the cowling for laterally deflecting the gas liquid mixture.

5. A gas-scrubber as claimed in claim 1, further comprising a skirt (33) extending downwardly from the top of the scrubber housing concentrically with the cowling but radially spaced therefrom to provide a downward flow path for the gas-scrubbing liquid mixtures.

6. A gas-scrubber as claimed in claim 1, wherein the gas distributing means is positioned and arranged in relation to the outlet from the gas inlet conduit portion to distribute gas angularly and radially outwardly.

7. A gas-scrubber as claimed in claim 6 in which the distributing means and conduit portion are positioned and arranged to define between them an annular gas outlet (13) which is directed upwardly.

8. A gas-scrubber as claimed in claim 7 in which the means defining the first scrubbing liquid inlet is constructed and arranged to define an annular inlet (15) substantially co-planar with the annular gas outlet.

9. A gas-scrubber as claimed in claim 1, further comprising a scrubbing liquid inlet positioned in an upper portion of the housing, and a float controlled valve disposed in said inlet to control the liquid flow therethrough.

10. A gas-scrubber as claimed in claim 9, further comprising a dividing wall (34) disposed within the housing so as to provide a separate chamber (35) in which the float controlled valve is located, and further comprising apertures positioned and arranged in the housing for providing access to and removal of the float controlled valve.

* * * * *